United States Patent [19]

Baker

[11] Patent Number: 5,686,957
[45] Date of Patent: Nov. 11, 1997

[54] TELECONFERENCING IMAGING SYSTEM WITH AUTOMATIC CAMERA STEERING

[75] Inventor: Robert G. Baker, Delray Beach, Fla.

[73] Assignee: International Business Machines Corporation, Armonk, N.Y.

[21] Appl. No.: 496,742

[22] Filed: Jun. 30, 1995

Related U.S. Application Data

[63] Continuation-in-part of Ser. No. 281,331, Jul. 27, 1994, Pat. No. 5,508,734.

[51] Int. Cl.$^6$ ........................................... H04N 7/18
[52] U.S. Cl. ........................... 348/36; 348/15; 348/53; 348/214; 348/580
[58] Field of Search ........................ 348/15, 214, 36, 348/53, 580; H04N 7/18

[56] References Cited

U.S. PATENT DOCUMENTS

| | | | |
|---|---|---|---|
| 4,264,928 | 4/1981 | Schober | 348/15 |
| 4,980,761 | 12/1990 | Natori | 348/15 |
| 5,508,734 | 4/1996 | Baker | 348/36 |

Primary Examiner—Howard W. Britton
Attorney, Agent, or Firm—Richard A. Tomlin; John C. Black; Malin, Haley, DiMaggio & Crosby, P.A.

[57] ABSTRACT

An automatic, voice-directional video camera image steering system specifically for use for teleconferencing that electronically selects segmented images from a selected panoramic video scene typically around a conference table so that the participant in the conference currently speaking will be the selected segmented image in the proper viewing aspect ratio, eliminating the need for manual camera movement or automated mechanical camera movement. The system includes an audio detection circuit from an array of microphones that can instantaneously determine the direction of a particular speaker and provide directional signals to a video camera and lens system that provides a panoramic display that can electronically select portions of that image and, through warping techniques, remove any distortion from the most significant portions of the image which lie from the horizon up to approximately 30 degrees in a hemispheric viewing area.

14 Claims, 7 Drawing Sheets

TELECONFERENCING IMAGING SYSTEM WITH AUTOMATIC CAMERA STEERING

This application is a continuation-in-part of U.S. patent application Ser. No. 281,331 filed Jul. 27, 1994 U.S. Pat. No. 5,508,734.

BACKGROUND OF THE INVENTION

1. Field of the Invention

This invention relates to a video conferencing system that has automatic, voice-directional camera image steering, and specifically to a teleconferencing system that employs automatic video image selection of the current participant speaking electronically selected from a panoramic video scene.

2. Description of the Prior Art

Teleconferencing provides for the exchange of video and audio information between remotely separated participants. Typically, a first group of participants is arranged around a conference table or seated strategically in a conference room and telecommunicating with a second group of participants similarly situated at a remote location. One or more video cameras at each location creates video images of the participants through manual manipulation of each video camera, normally directed at the participant speaking at the moment. Microphones at each location provide for sound transmission signals. The video image and audio voice signals are then transmitted to the remote location. The video image is projected onto a large screen or other type of video display which also would include audio outputs for providing the sounds.

Manual manipulation of each video camera at each conference site is required to change the direction of each camera to different participants as speakers change, unless a large overall view of all the participants is maintained. Such a process is labor intensive. Also image content and perspective, dependent on the location of the video camera relative to the participants, contributes to the quality of the final visual display available to the participants watching the display screen. The quality of the image and the scene content all contribute to the overall effectiveness of the telecommunication process. In particular, in a setting such as a conference table in a conference room, a hemispheric or panoramic viewpoint would be much more efficient for video image capture of surrounding selected participants. With a hemispheric scene, certain efficiencies are gained by eliminating large areas that are unused scene content while concentrating on a band of hemispheric areas populated by the teleconferencing participants. Therefore, it is believed that hemispheric or panoramic electronic imaging would be greatly beneficial to a teleconferencing environment, especially when controlled with audio directional processors. The selected video image is taken from a desired segment of a hemispherical view in the correct video aspect ratio. A centralized panoramic image capture system which already has a distorted picture of the hemisphere bounded by the plane of the table upward selects a portion of the scene and warps the image to correspond to a normal aspect ratio view of the person speaking. The signal can be converted to whatever display format is desired for transmission to a remote location. The present invention has incorporated, in one automated system, audio beam steering and electronically selectable subviews of a much larger panoramic scene. The video/subviews can be converted to an NTSC display format for transmission to a remote location for video display.

The collection, storage, and display of large areas of visual information can be an expensive and difficult process to achieve accurately. With the recent increased emphasis on multimedia applications, various methods and apparatuses have been developed to manage visual data. A unique class of multimedia data sets is that of hemispheric visual data. Known multimedia methods and apparatuses attempt to combine various multimedia imaging data, such as still and motion (or video) images, with audio content using storage media such as photographic film, computer diskettes, compact discs (CDs), and interactive CDs. These are used in traditional multimedia applications in various fields, such as entertainment and education. Teleconferencing is an application where automated electronic selection of scene content would result in greatly improved usability. Non-multimedia applications also exist that would employ hemispheric visual data, such as in security, surveillance, unmanned exploration, and fire and police situations. However, as will be described below, the known methods and apparatuses have certain limitations in capturing and manipulating valuable information and hemispheric scenes in a rapid (i.e., real-time) and cost effective manner.

One well known multimedia technique is used at theme parks, wherein visual information from a scene is displayed on a screen or collection of screens that covers almost 360 degrees field of view. Such a technique unfortunately results in the consumption of vast quantities of film collected from multiple cameras, requires specially designed carriages to carry and support the cameras during filming of the scene, and necessitates synchronization of shots during capture and display. The technique is also limited in that the visual image cannot be obtained with a single camera nor manipulated for display, e.g., pan, tilt, zoom, etc., after initial acquisition. Hence, this technique, while providing entertainment, is unable to fulfill critical technical requirements of many functional applications.

Other known techniques for capturing and storing visual information about a large field of view (FOV) are described in U.S. Pat. Nos. 4,125,862; 4,442,453; and 5,185,667. In U.S. Pat. No. 4,125,862, a system is disclosed that converts signal information from a scene into digital form, stores the data of the digitized scene serially in two-dimensional format, and reads out the data by repetitive scan in a direction orthogonally related to the direction in which the data was stored. U.S. Pat. No. 4,442,453 discloses a system in which a landscape is photographed and stored on film. The film is then developed, with display accomplished by scanning with electro-optical sensors at "near real-time" rates. These techniques, however, do not provide instant visual image display, do not cover the field of view required for desired applications (hemispheric or 180 degrees field-of-view), do not generate visual image data in the format provided by the techniques of this invention, and are also not easily manipulated for further display, e.g., pan, tilt, etc.

The technique disclosed in U.S. Pat. No. 5,185,667 overcomes some of the above-identified drawbacks in that it is able to capture a near-hemispheric field of view, correct the image using high speed circuitry to form a normal image, and electronically manipulate and display the image at real-time rates.

For many hemispheric visual applications, however, even U.S. Pat. No. 5,185,667 has limitations in obtaining sufficient information of critical and useful details. This is particularly true when the camera is oriented with the central axis of the lens perpendicular to the plane bounding the hemisphere of acquisition (i.e. lens pointing straight up). In such applications, the majority of critical detail in a scene is contained in areas of the field along the horizon and little or no useful details are contained in central areas of the field located closer to the axis of the lens (the horizon being defined as the plane parallel to the image or camera plane and perpendicular to the optical axis of the imaging system). For example, in surveillance, the imaging system is aimed upward and the majority of the critical detail in the scene includes people, buildings, trees, etc., most of which are located within only a few degrees along the horizon (i.e., this is the peripheral content). Also, in this example, although the sky makes up the larger central arc of the view, it contains little or no useful information requiring higher relative resolution.

To obtain sufficient detail on the critical objects in the scene, the technique should differentiate between the relevant visual information along the horizon and the remaining visual information in the scene in order to provide greater resolution in areas of higher importance. U.S. Pat. No. 5,185,667 does not differentiate between this relevant visual information contained along the horizon and the remaining visual information in this scene. Thus, it fails to yield a sufficient quality representation of the critical detail of the scene for projected applications.

Instead, techniques described above concentrate on obtaining, storing, and displaying the entire visual information in the scene, even when portions of this information are not necessary or useful. To obtain the near-hemispheric visual information, such techniques require specific lens types to map image information in the field of view to an image plane (where either a photographic film or electronic detector or imager is placed). Known examples of U.S. Pat. No. 5,185,667 and U.S. Pat. No. 4,442,453 respectively use a fish-eye lens and a general wide-angle lens. As these lenses map information of a large field without differentiation between the central and peripheral areas, information from the periphery will be less fully represented in the image plane than from the central area of acquisition.

In U.S. Pat. No. 4,170,400, Bach et al. describes a wide-angle optical system employing a fiber optic bundle that has differing geometric shapes at the imaging ends. Although this is useful in itself for collecting and repositioning image data, bending of light is a natural characteristic of optical fibers and not exclusive to that patent. Further, U.S. Pat. No. 4,170,400 employs a portion of a spherical mirror to gather optical information, rendering a very reduced subset of the periphery in the final imaging result. This configuration is significantly different from the multi-element lens combination described in the present invention.

Imperfections in the image representation of any field inherently result from the nature of creating an image with any spherical glass (or plastic) medium such as a lens. The magnitude of these imperfections increases proportionally to the distance a point in the field is from the axis perpendicular to the optical imaging system. As the angle between the optical axis and a point in the field increases, aberrations of the corresponding image increase proportional to this angle cubed. Hence, aberrations are more highly exaggerated in the peripheral areas with respect to more central areas of a hemispheric image.

Although the lens types above achieve a view of a large field, the valuable content from the peripheral areas lacks in potential image quality (resolution) mapping because the imaging device and system does not differentiate between these areas and the central areas of less valuable detail. Often, the difference between the imaging capabilities between the two areas is compensated for by using only the central portion of a lens to capture the scene ("stopping the lens down"). This works in effect to reduce the image quality of both areas such that the difference in error is a lesser percentage of the smallest area even the central area can resolve. Simultaneously, this compensation technique further degrades the performance of the lens by limiting the amount of light which is allowed to enter the lens, and thus reducing the overall intensity of the image.

More typically, the peripheral content imaged by a conventional lens is so degraded in comparison with the central area that the lens allows for only a minimal area of the periphery to be recorded by the film or electronic imager. As a result of these "off-axis" aberrations inherent to large field, the relevant information of the horizon in the scene can be underutilized or worse yet, lost.

Another limitation in U.S. Pat. No. 5,185,667 is its organization for recording only views already corrected for perspective. The nature of that methodology is that the specific view of interest must be selected and transformed prior to the recording process. The result is that no additional selection of views can be accomplished after the storage process, reducing system flexibility from the user's perspective.

Hence, there is a demand in the industry for single camera imaging systems that efficiently capture, store, and display valuable visual information within a hemispheric field of view containing particularly peripheral content, and that allow electronic manipulation and selective display of the image post-acquisition while minimizing distortion effects.

Such a system finds advantageous application in a teleconferencing environment in accordance with the present invention.

Limited control of video cameras is disclosed in the prior art. U.S. Pat. No. 4,980,761 issued to Natori, Sep. 25, 1990 describes an image processing system that rotates a camera for a teleconference system. A control unit outputs a drive signal based on an audio signal to control the movement of the image until the image controlling unit receives an operational completion signal. In this case, the rotational movement of the camera, moving the video image from one participant to another participant, alleviates having to view the camera movement. Once the camera stops skewing, the picture will then provide the proper aspect ratio. A plurality of microphones are provided to each attendant. A sound control unit then determines with a speaker detection unit which participant is speaking. U.S. Pat. No. 4,965,819 shows a video conferencing system for courtroom and other applications in which case each system includes a local module that includes a loud speaker, a video camera, a video monitoring unit and a microphone for each local conferee. U.S. Pat. No. 5,206,721 issued to Ashida, Apr. 27, 1993, shows a television conference system that allows for automatically mechanically moving and directing a camera towards a speaking participant. In this system a microphone is provided for each participant and is recognized by the control system. Image slew is corrected to avoid camera image motion. A review of these systems thus shows that the automation provided is very expensive and in every case requires individualized equipment for each participant.

Limited audio direction finding for multiple microphone arrays is known in the prior art. For example, a self steering digital microphone array defined by W. Kellerman of Bell Labs at ICASSP in 1991 created a teleconference in which a unique steering algorithm was used to determine direction of sound taking into account the acoustical environment in which the system was located. Also a two stage algorithm for determining talker location from linear microphone array data was developed by H. Silverman and S. Kirkman at Brown University and disclosed in April, 1992. The filtered cross correlation of the system is introduced as the locating algorithm.

A "telepresence" concept from BellCorp briefly described in IEEE Network Magazine in March, 1992 suggests a spherical camera for use in the teleconference system. However, the entire image is sent in composite form for the remote users to select from at the other end. The present invention is quite different and includes automated pointing and control including incorporation in one automated system of both audio beam steering and selectable subviews of a much larger panoramic scene.

SUMMARY OF THE INVENTION

The present invention comprises a video conferencing, voice-directional video imaging system for automatic electronic video image manipulation of a selected, directional signal of a hemispheric conference scene transmitted to a remote conference site. The system employs three separate subsystems for voicedirected, electronic image manipulation suitable for automated teleconferencing imaging in a desirable video aspect ratio.

The audio beam, voice pickup and directing subsystem includes a plurality of microphones strategically positioned near a predetermined central location, such as on a conference table. The microphone array is arranged to receive and transmit the voices of participants, while simultaneously determining the direction of a participant speaking relative to the second subsystem, which is a hemispheric imaging system used with a video camera. The third subsystem is a personal computer or controller circuits in conjunction with the hemispheric imaging system which ultimately provides automatic image selection of the participant speaking that is ultimately transmitted as a video signal to the remote video display at the remote teleconference location.

The hemispheric electronic image manipulator subsystem includes a video camera having a capture lens in accordance with the invention that allows for useful electronic manipulation of a segmented portion of a hemispheric scene. In a conference table setting, as viewed from the center of the conference table, participants are arranged around the table in the lower segment of the hemisphere, with the plane of the table top forming the base of the hemisphere. The electronic image is warped to provide a desired subview in proper aspect ratio in the audio selected direction.

The present invention provides a new and useful voice-directional visual imaging system that emphasizes the peripheral content of a hemispheric field of view using a single video camera. The invention allows user-selected portions of a hemispheric scene to be electronically manipulated, transmitted, and displayed remotely from the video camera in real-time and in a cost-effective manner.

The visual imaging system of the present invention involves a video image having a lens with enhanced peripheral content imaging capabilities. The lens provides an enhanced view of the valuable information in the scene's periphery by imaging the field of view to the image plane such that the ratio of the size of the smallest detail contained within the periphery of the scene to the size of the smallest resolving pixel of an image device is increased. For this to be accomplished, the peripheral content must map to a larger percentage of a given image detector area and, simultaneously, the mapped image of the central area of the scene must be minimized by the lens so that it does not interfere with the peripheral content now covering a wider annulus in the image plane. Information in the image plane is then detected by the video camera. The detected information of the entire hemispheric scene is then stored as a single image in memory using traditional methods.

When a portion of the scene is to be displayed, the image information relating to the relevant portion of the scene is instantaneously retrieved from memory. A transform processor subsystem electronically manipulates the scene for display as a perspective-correct image on a display device, such as a teleconference display screen or monitor, as if the particular portion of the scene had been viewed directly with the video camera pointed in that direction. The transform processor subsystem compensates for the distortion or difference in magnification between the central and peripheral areas of the scene caused by the lens by applying appropriate correction criteria to bring the selected portion of the scene into standard viewing format. The transform processor subsystem can also more fully compensate for any aberrations of the enhanced peripheral image because of the image's improved resolution as it covers a larger portion of the image device (increased number of pixels used to detect and measure the smallest detail in the periphery image). More pixels equates to more measurement data, hence more accurate data collection.

The stored image can also be manipulated by the transform processor subsystem to display an operator-selected portion of the image through particular movements, such as pan, zoom, up/down, tilt, rotation, etc.

By emphasizing the peripheral content of a scene, the visual imaging system can use a single camera to capture the relevant visual information within a panoramic field of view existing along the horizon, while being able to conventionally store and easily display the scene, or portions thereof, in real-time. Using a single optical system and camera is not only cost-effective, but keeps all hemispheric visual data automatically time-synchronized.

In the present invention, at a conference table view point, with participants seated around a conference table, hemispheric scene content is ideally suited for segmented subviews of participants, especially when directionally electronically manipulated by voice actuation. The video image should be of the current speaker.

One advantage of the present invention is that the unique visual imaging system lens can capture information from a hemispheric scene by emphasizing the peripheral portion of the hemispheric field of view and thus provide greater resolution with existing imaging devices for the relevant visual information in the scene. As an example, if an ordinary fisheye lens focuses the lowest 15 degrees up from the horizon on ten percent of the imager at the imaging plane and the peripheral-enhancing lens focuses that same 15 degrees on fifty percent of the imager, there is a five-fold increase in resolution using the same imaging device. Depending on the application and exact formulation of the lens equations, there will be at least a five times increase in resolving power by this lens/imager combination.

The third subsystem of the present invention comprises a control apparatus such as a personal computer or other collection of electronic circuits, connected to the imagery system to allow flexible operation delivering options and defaults, including an override of the automated video image manipulation. A minimal control program is the software of the host controller to provide the options that may be necessary for individual teleconferences. An example would be to delay switching time segments between speakers, or perhaps the use of alternate cameras that may include a dual display.

In operation, at a particular teleconferencing site, participants will be arranged at a conference table or in a conference room with an array of microphones, each of which will pick up the normal speaking voice of each participant. The array of microphones is directly connected to an audio direction processor. The hemispheric lens system in conjunction with the video camera is attached to view warping logic as explained above and to the controller, or a personal computer. The video and audio signals are then transmitted through a transmission medium in an NTSC or other format to the remote teleconferencing site for remote display.

Sound from the participant speaking that is processed in the audio direction processor determines the direction of the participant speaking relative to the panoramic video camera and lens. Once the particular speaker direction is determined, the panoramic image of a specific hemispherical region of interest, such as the participant's face, is processed to provide a normal video aspect ratio view for the remote participants using the system.

It is a principal object and advantage of this invention to provide a video conferencing system that automatically directs a video image to the participant that is speaking while providing a hemispherical video imaging subview that can be electronically manipulated in the direction of the speaker selected from a panoramic scene.

It is another principal advantage of this invention to provide an automatic teleconferencing system that saves transmission time, reduces coincident cost by eliminating or reducing manual operation of a video camera, and does not detract from the concentration of the subject during the conference.

And yet another advantage of this invention is to provide an automatic video camera with electronic image manipulation for video conferencing equipment that has no moving mechanical parts or physical mechanisms which improves the reliability of the system and reduces maintenance costs and service costs.

In accordance with these and other objects which will become apparent hereinafter, the instant invention will now be described with particular reference to the accompanying drawings.

BRIEF DESCRIPTION OF THE DRAWINGS

FIGS. 3AA, 3AB, and 3AC show a cross sectional diagram indicating the field input and output rays and the resulting field coverage that optical system Example I, constructed according to the principles of the present invention, provides in the image plane for detection by an imaging device or substrate.

FIGS. 3BA, 3BB show a cross sectional diagram indicating the field input and output rays and the resulting field coverage that optical system Example II of this present invention provides in the image plane for detection by an imaging device or substrate.

DESCRIPTION OF THE PREFERRED EMBODIMENTS

The invention will be defined initially with a brief description of the principles thereof.

Principles of the Present Invention

As described in the parent U.S. patent application, the imaging invention stems from the realization by the inventors that in many of the technical hemispheric field applications, where the image detector is parallel to the plane of the horizon, much of the relevant visual information in the scene (e.g., trees, mountains, people, etc.) is found only in a small angle with respect to the horizon. Although the length of the arc from the horizon containing the relevant information varies depending upon the particular application, the inventors have determined that in many situations, almost all the relevant visual information is contained within about 10 to 45 degrees with respect to the horizon. This determination is especially true with respect to the teleconference environment which is normally centered around a conference table or conference room.

To maximize data collection and resolution for analysis and/or display of the relevant visual information located in this portion of the hemispheric scene, it is desirable to maximize the dedication of the available image detection area to this peripheral field portion. To accommodate this, it is necessary that the "central" portion of the scene (from 45 to 90 degrees with respect to the horizon) cover only the remaining areas of the imager plane so as not to interfere with light from the periphery.

In many cases, since the "central" area contains less detailed information, such as a solid white ceiling or a clear or lightly clouded sky, it is allowable to maximize completely the dedication of the available image detection area to the peripheral field portion by reducing the portion of the imager device representing the "central" area to near zero. Of course, in certain instances, it is desirable to analyze this less detailed information, but this portion of the scene can be minimized to some extent without significant degradation of such visual information. As will be described herein in more detail, the present invention provides two manners (Example I and Example II) for capturing, storing, and selectively displaying the critical visual information in a scene for many important applications.

System Organization and Components

Figure 1:
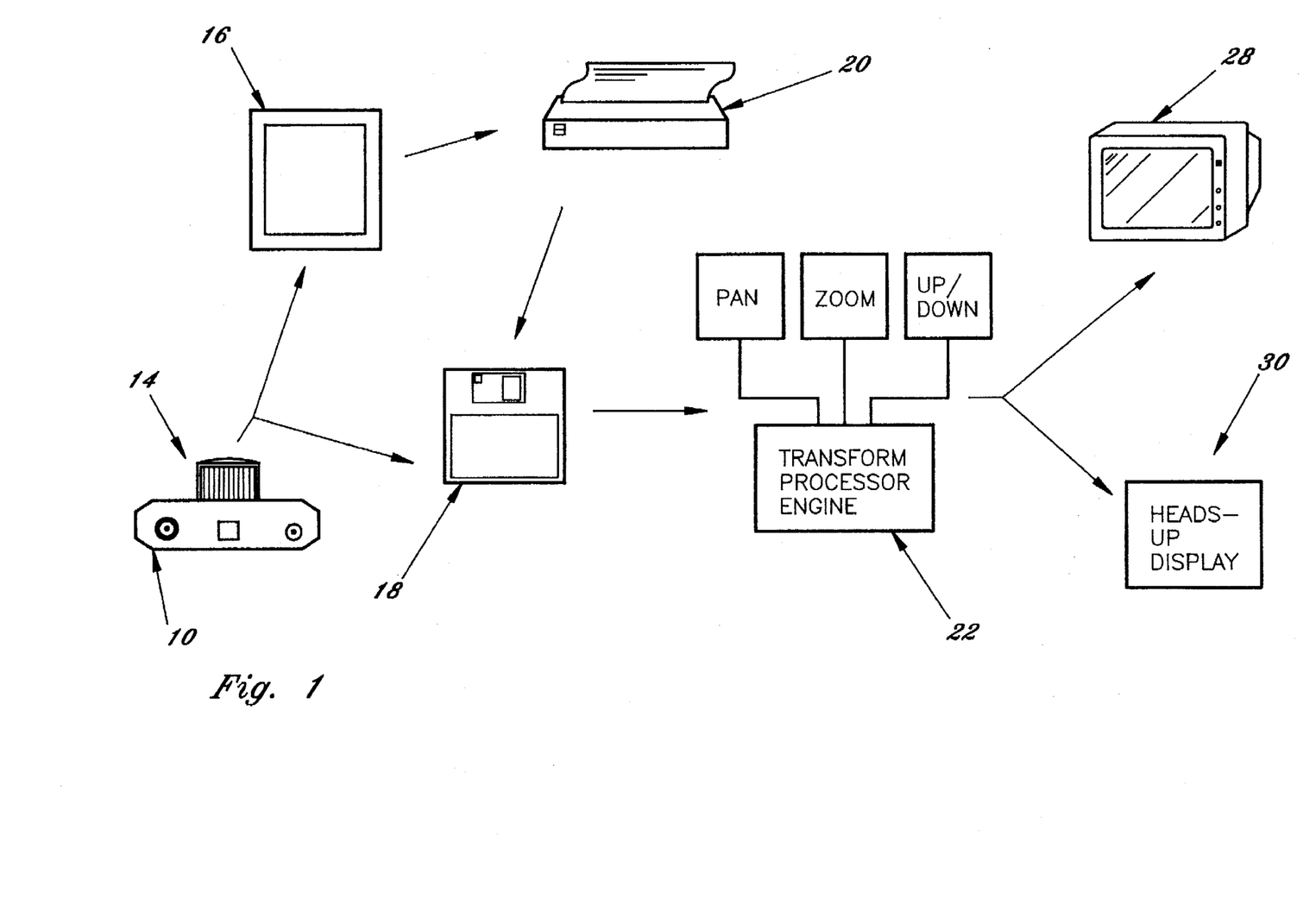
FIG. 1 is a schematic illustration of the visual imaging system organization and components of the parent application.

Referring now to the drawings, and initially to FIG. 1, the visual imaging system of the parent invention includes a still image or moving picture camera 10, having a lens, indicated generally at 14, designed to capture and enhance the peripheral content of a hemispheric scene. The captured scene can be stored onto an assortment of media, e.g., photographic film 16, electronic storage 18, or other conventional storage means. Electronic storage 18 is preferred because of the ease of electronic manipulation thereof. Additionally, photographic film 16 requires an image scanner 20 or other capture-and-conversion method to change the image into electronic format before electronic manipulation can be performed. A video camera 11 in FIG. 1A is used for the teleconferencing system to capture the image.

The stored electronic image data is then selectively accessed by a transform processor engine 22 and can be electronically manipulated according to user-defined criteria, such as pan, up/down, zoom, etc. The transform processor 22 corrects the image for display on a conventional display device 28 such as a video monitor or a video projection display system in a normal viewer format or on head-mounted displays 30, in which integrated orientation-sensing devices can be used to manipulate the user controls.

Figure 1A:
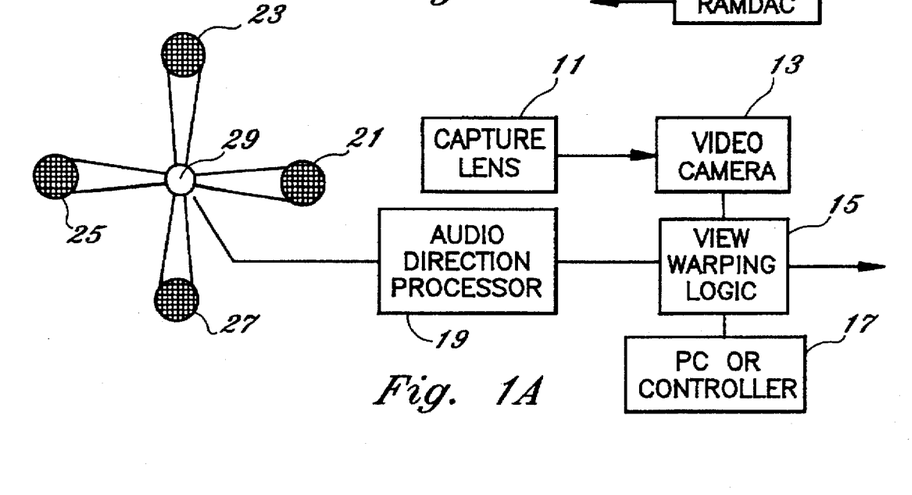
FIG. 1A is a schematic illustration of the automated video conferencing system organization and components.

Referring to FIG. 1A, the audio directive component of the teleconferencing system for the present invention is comprised of four microphones spaced apart which would be arranged concentrically about the lens and camera on a conference room table so that all of the participants in the conference will have audio access to the microphones for transmission of sound. The primary purpose of the invention is to provide automated camera steering of the video camera 11 scenes based on which particular participant is currently speaking. Therefore, the audio energy from a particular participant speaking will be the basis for directing the video camera imaging as discussed below. The microphones 21, 23, 25, and 27 are connected to a speaker detection circuit 29. The audio generated signals from the microphones are transferred to a mixer and sampling circuit in audio direction processor 19. In one particular embodiment, each microphone input would be sampled to determine which has the largest amplitude of signals or which one has signals, to determine the specific direction for steering the video camera. Once the audio detection circuits and sampling circuits have determined which microphone is the microphone being used by the current speaker, this signal information is conveyed to the audio direction processor 19 which is correlated between the location of a particular microphone in use and the video imaging system providing the segmented image discussed below. Thus, using the microphone array and audio circuitry, a signal can be arrived at from the audio direction processor to the imaging system to give relevance of which direction or which segment of the panoramic image should be selected as a function of the current participant speaking. Determining the direction of the source of acoustical waves from an array of sensors such as an array microphone is known. Audio speaker detection circuitry is disclosed in U.S. Pat. No. 5,206,721 cited above. Additional discussion on the broad concepts can be found in *Array Signal Processing: Concepts and Techniques*, authored by Don H. Johnson and Dan E. Dudgeon, chapter 4, Beamforming, published by PTR Prentice-Hall, 1993, and *Multidimensional Digital Signal Processing*, authored by Dan E. Dudgeon and Russell M. Mersereau, chapter 6, Processing Signals Carried by Propagating Waves, published by Prentice-Hall, Inc., 1984. In the present system, the number of participants can substantially exceed the number of microphones. The video imaging system, which will ultimately provide images of the participant speaking for the teleconferencing, then receives the audio direction processor signal as an input to select the specific imaging segment as described below.

I. Image Acquisition

A. Camera

As described in the parent application, the camera 10 for the visual imaging system is an optical device that is capable of receiving a focused image from a lens and transforming that image into an electronic signal or into hard copy storage such as photographic film. Various types of cameras for wide-angle viewing are known to those in the art, such as 35 mm cameras, 8 mm cameras, NTSC, RS170, and HDTV-type cameras. The present invention is designed to be compatible with most commercially available two-dimensional cameras, with scaling of the lens geometries. It also has the technological capability to be applied to three-dimensional cameras. The camera can be mounted and supported in a conventional manner.

FIG. 1A shows a teleconferencing system in accordance with the present invention, including an NSTC video camera 11 using the capture lens 13, view-warping logic 15, and PC or master controller 17, which receives input from four microphones 21, 23, 25, and 27 disposed apart around a central audio connector 29, the output of which is connected to the audio direction processor 19. By detecting the differences in audio signal amplitude obtained from each microphone, the audio direction processor can determine the closest microphone to the current participant speaking. It is also possible, by normal audio beam steering techniques, to select points between microphones, such that the number of participants can far exceed the number of microphones. The video camera 11 lens viewing angle segment based as a panoramic view can then be electronically changed through the view-warping logic and the PC or master controller 17 to automatically shift the segmented scene content in the direction of the person speaking at the time. Note that the video camera 11 will be physically located in a central area, preferably in the center of the conference table, whereby a panoramic view of the participants at the conference table or in a conference room can be obtained so that the relative bearing from a central camera location to a particular participant can be established relative to the panoramic scene desired and the particular amount of scene content to accurately represent and provide the proper video aspect ratio of a particular speaker while that person is speaking.

B. Lens With Enhanced Peripheral Content

The fundamental principle behind the enhanced peripheral content lens is the selective magnification of the periphery and the focusing of more of that content on the imaging plane. This recognizes the current limitations of imaging devices and film with regard to resolution. As such, the more of the peripheral content that can be focused on the imaging plane surface, the more points of data that can be resolved with a given density of imaging device or material. Therefore, for this new class of selective magnification lenses, the surface area of the imaging plane reserved for peripheral content will be large relative to the central content and roughly similar for all lenses in this class, regardless of whether the lens is designed for 1–10 degree peripheral emphasis or 1–45 degree peripheral emphasis. However, it should be noted that the lens with 1–10 degree emphasis will have much better resolution for the same objects than the lens with 1–45 degree emphasis.

The lens 13 in FIG. 1A for video camera 11 provides a collection of data for enhanced digital processing of the peripheral portion of a given field of view. The lens uniquely achieves this by filling the greater available area of an imager device with the peripheral areas rather than the central areas of the captured scene.

Figure 3:
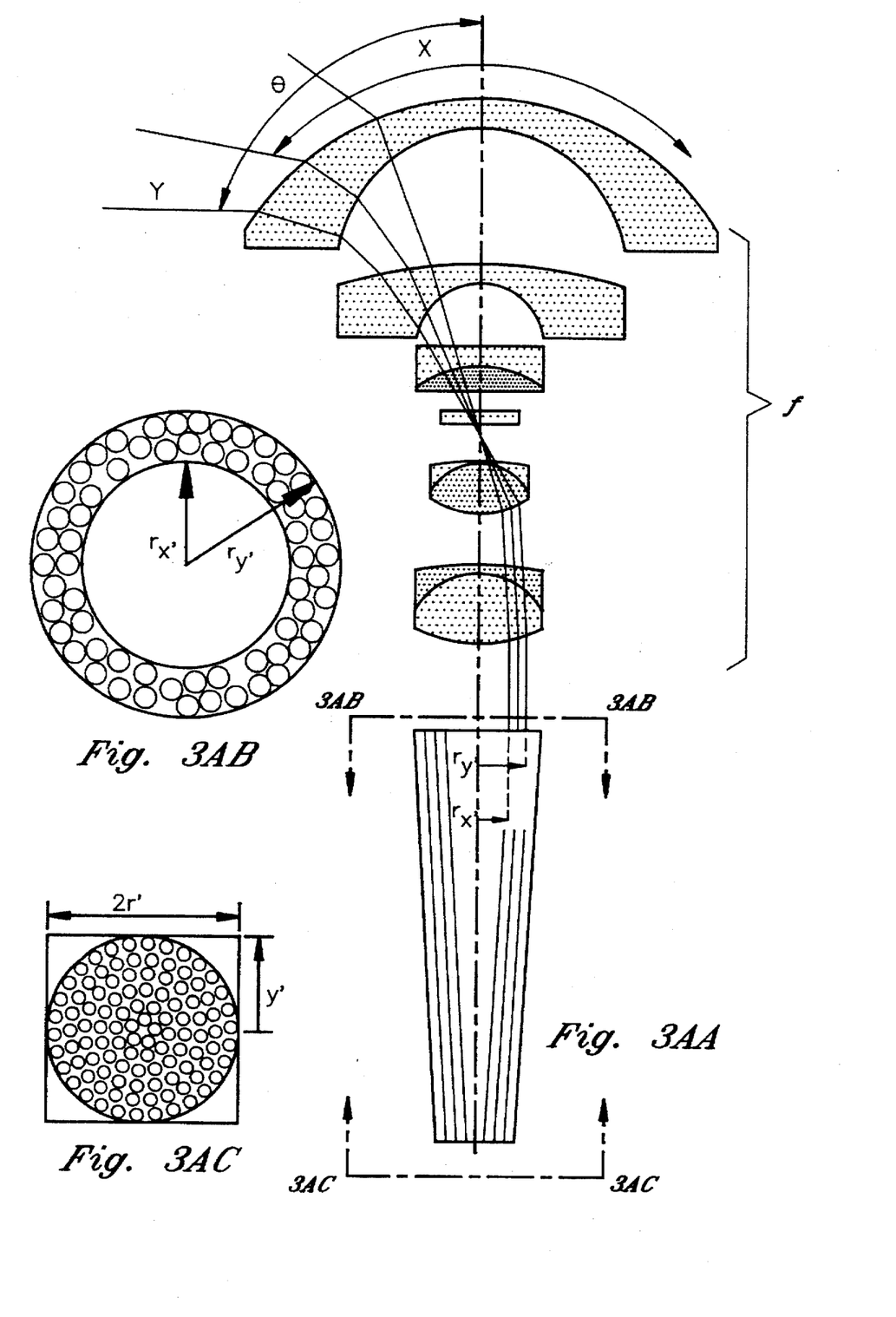

A periphery-enhancing optical system suitable for achieving the goals of the present invention can be configured in various ways to present an image of the field free of detrimental values of critical aberrations. Two examples or embodiments are preferred. Example I in FIGS. 3AA–3AC,m preferably is a multi-medium system comprising a wide-angle multi-element optical lens and a fiber optic imager device. Example II preferably is a combination system comprised of multiple refractive optical elements, one of which is of gradient index material, hemispherical in shape. The inventors define that other configurations relying on binary optics could also be utilized to accomplish similar results.

The system of Example I is best suited for applications where the capture of the minimal information contained in the central area is irrelevant. A coordinated fiber bundle array, either rigid or flexible, carefully aligned and assembled by methods known to those skilled in the art, is used to capture a peripheral annulus of the wide field image provided by the multi-element wide field lens. (REF. Journal of the Optical Society of America, 1964; lens designs presented by Miyamota. Also see U.S. Pat. No. 4,256,373 by M. Horimoto for additional wide-field lenses.) The multi-element wide field lens therefore, although covering the same field as standard wide field lenses, is required to provide a larger image of the entire field. This can be accomplished by those skilled in the art by scaling a standard lens to a larger focal length until the desired image size is reached. (REF. Chapter 5.4, "Scaling a Design" of Modern Lens Design, Warren J. Smith, McGraw-Hill inc., copyright 1992.)

The fibers, arranged in a specific mechanical manner, deliver the information in a geometrically annular shape from the peripheral image area to either the rectangular or circular shape of a specific imaging device. Specific configurations can be devised for desired peripheral coverage (up to 10 degrees through 45 degrees) and matched to required image detector plane geometry. (REF. Sect. 13, Fiber Optics, Handbook of Optics, McGraw-Hill Inc., 1978.) Referring to FIGS. 3AA–3AC for a desired angle θ (theta), a standard wide-field lens design is scaled in "f," the length of the square camera imaging device (2r') is met. In the "Camera/Imager Interface" portion of the figure, the equation for fiber bundle radius r' as related to the imager is:

Area at imager=$(pi)r^2_{y'}-(pi)r^2_{x'}=(pi)$ $(r^2_{y'}-r^2_{x'})$

Imager length=2r', where r'=square root $[r^2_{y'}-r^2_{x'}]$

A configuration in the form of Example I achieves an image in which the peripheral portion (0–45 degrees with respect to the horizon) of the field of view preferably encompasses between approximately 90% to 100% of the entire usable area of the imager device, rather than the 35% or less that is typical with commercially available wide-angle, fish-eye, or other conventional lenses. A configuration in the form of Example II achieves an image in which the peripheral portion preferably encompasses between 50% to 70% of the usable area of the imaging device surface.

The system of Example II is best suited for applications where all information contained in the field of view is relevant, although to differing degrees. The combination system of Example II relies on the principal use of a Bravais System where a hemispherical lens or a combination of lenslets magnify an object to an image, wherein the object and image lie in the same plane. In this case, the hemispherical lens is made of gradient index material such that points impinging the image plane incur different factors of magnification depending on what index of refraction and what portion of the hemispherical curve or lenslets they pass through. This concept is used in combination with a multi-element refractive lens that is designed to capture a wide field of view and also compensate for the color aberration induced by insertion of the hemispherical lens. This color compensation can be designed by those skilled in the art by using a computer optimization routine. (REF. Mercado et al. and U.S. Pat. No. 5,210,646 on "Color Corrected Optical Systems and Method of Selecting Optical Materials Thereof." Also see Chapter 9 of the Users Manual for "Three Color Optimization" using Kidger Optics Optical Design Program v.4.71, copyright Kidger Optics 1983–1989.) By use of the hemispherical gradient index unit with a wide field multi-element lens, the portion of the camera dedicated to the periphery is increased, thereby increasing the relative resolution of information detectable by the imaging device sensing elements. With the gradient index hemisphere, index values decrease from the center, such that:

$n_1 < n_2 < n_3 < n_4$

The operation of the optical systems is schematically illustrated in FIGS. 2A–2C and 3BA–3BB. The arc X represents the field of view of the "center" portion of the "peripheral" field. The areas X' and Y' represent the subtended peripheral angles of incidence. Arc Z and area Z' represent areas outside the normal imaging range of the lens. (No actual demarcation lines would exist in actual use; this is merely for exemplary purposes.)

Figure 2A:
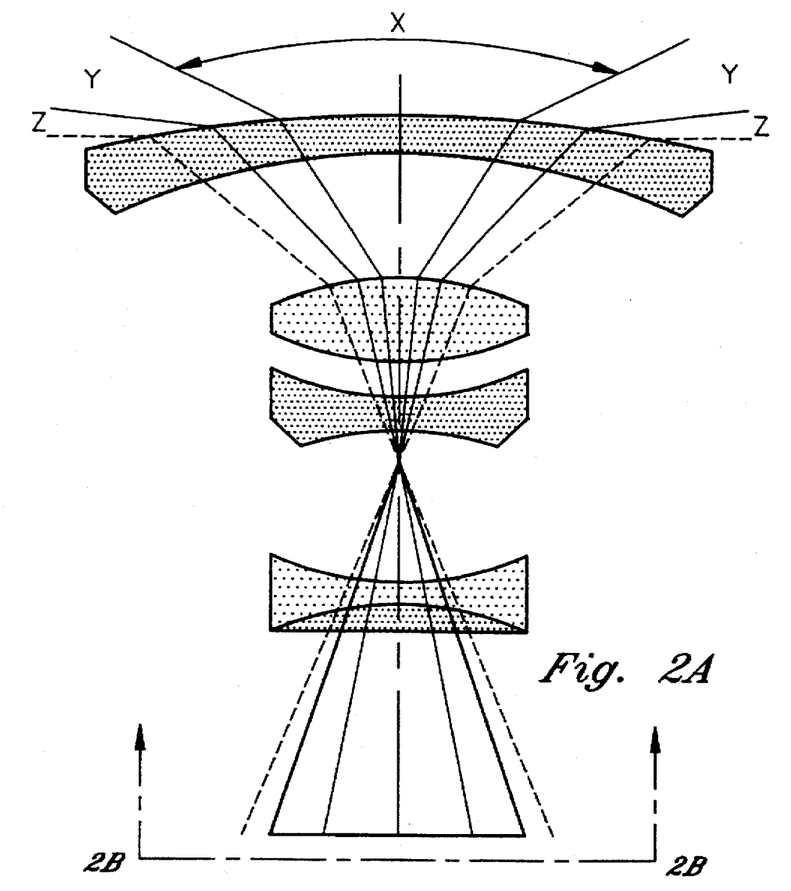
FIGS. 2A, 2B, and 2C show a cross sectional diagram indicating the field input and output rays and the resulting relative field coverage a lens typically provides in the image plane for detection by an imager device.
Figure 2B:
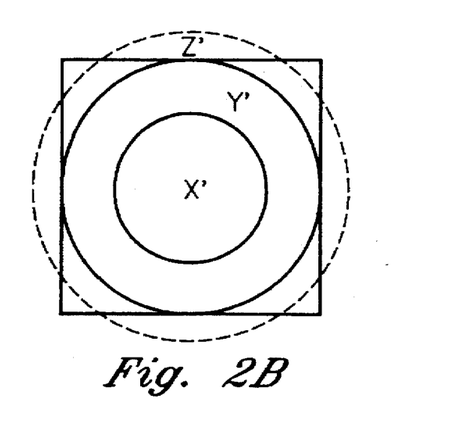
Figure 2C:
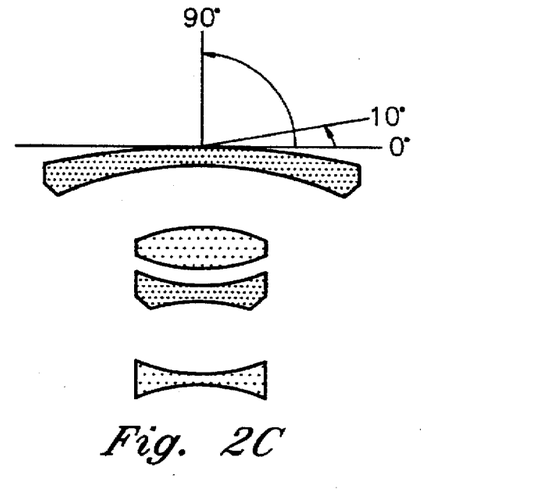

FIGS. 2A–2C represents a typical wide-angle type lens, while FIGS. 3BA–3BB represents a lens constructed according to the principles of the present invention. As should be apparent from comparing FIGS. 2A–2C and 3BA–3BB, a typical wide-angle type lens has a fairly significant portion of the imaging surface dedicated to the central field of the lens; while the lens constructed according to the present invention has a fairly significant portion of the imaging surface dedicated to the peripheral field, and consequently less of the surface dedicated to the central field.

The portion of the imaging surface used for the peripheral portion of the scene (as compared with the central portion of the scene) can vary depending upon the particular prescription of lens specified, which is selected to capture items of interest for a given application. For example, if the imaging system is used to capture a panorama of an outdoor scene, the relevant visual information may be contained within 10 degrees of the horizon. The lens of the present invention can thus be designed to enhance only the field of view within 10 degrees of the horizon. On the other hand, if the imaging system is being used to capture a room scene within a building, the relevant visual information may include objects on walls and thus be contained within about 45 degrees from the horizon. A peripheral enhancing lens can thus also be designed to enhance the field of view up to 45 degrees from the horizon. Of course, the enhanced portion of the field of view depends upon the needs of the particular application, with the enhanced portion preferably falling somewhere between these two extremes. In any case, the principles of the present invention can be applied to these types of situations with equal success, with any appropriate corrections being made with the image transform processors, as will be described herein in more detail.

As illustrated in FIGS. 3AA–3AC, a preferred form of the Example I form of optical system comprises a standard wide field lens and a coordinated fiber array. The focal length of the wide field lens is scaled in order to match the peripheral field of view desired. The coordinated fiber array consists of an annular input face that collects the image projected from the standard wide field lens. The fiber bundle array then redirects the information from the peripheral view to its output end by total internal reflection. Fibers capable of 3 micron accuracy, covering the area of the annual region, are coordinated into a rectangular or circular shape at their output, depending on the geometry of the corresponding imaging device. The size of output is also matched to the camera imaging device used.

Of course, these system configurations and parameters are only exemplary in nature and other configurations and parameters of the present invention could be used to provide enhanced peripheral imaging capabilities, as should be apparent to those skilled in the art.

C. Imager Device

With the present invention, a video camera 11 receives the optical image from the lens and fiber optic array.

It should be apparent from the above discussion that when the imager device is used with a lens constructed according to the principles of the present invention, the imager device will collect more information along the horizon than it will from the central area of the hemispheric scene. With only a given limited resolution of either film emulsions or CCD pixel density, the lens focuses more useful information at the imaging plane. The peripheral portion of the scene will therefore have a higher relative resolution in the resultant transformed image than the central portion. Thus, the details of any objects along the horizon will be more highly accentuated. Further, any distortion (e.g., spherical aberration) that occurs in the peripheral region of the lens will be imaged onto a larger surface area and can thus be more easily and fully compensated for. Also, as imaging device resolution improvements are made over time, peripheral enhancing lenses and configurations will continue to yield improved visual renditions.

Figure 4:
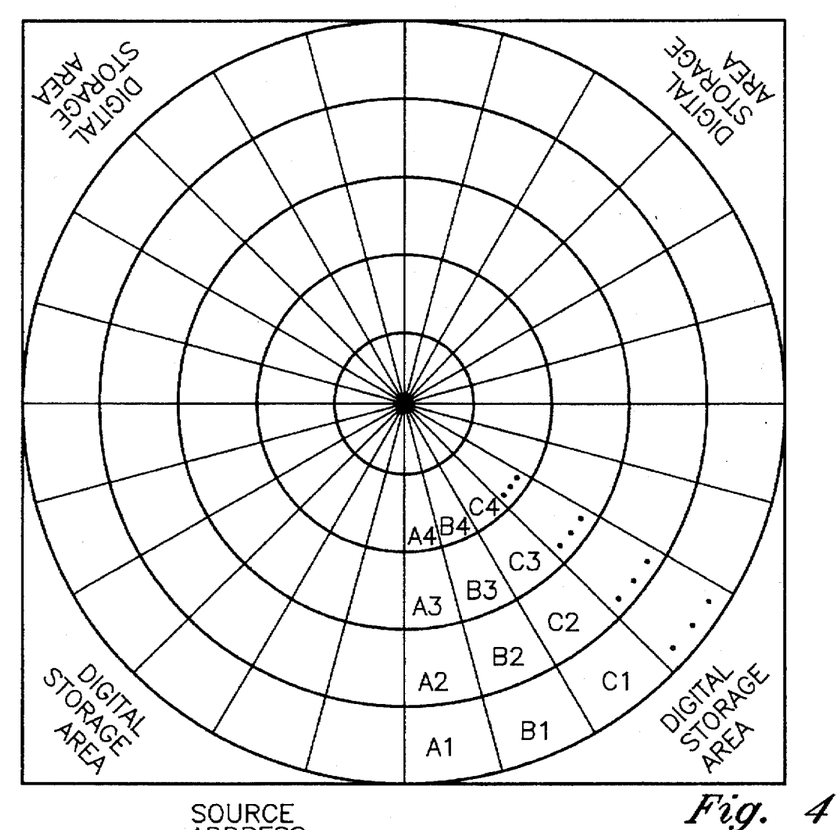
FIG. 4 is a schematic representation of the mapping locations on the imaging device.

The image mapped onto the imager device can be described by a series of concentric circles, as schematically illustrated in FIG. 4. As an example, each circle on the imager device can be described by radii of arbitrary units, e.g., 2, 5, 9, 14, etc. The radii of the circles depends on the magnification of the different regions of the hemisphere, with the blocks in the outer circles having a greater area as the magnification of the peripheral region increases. In an arbitrarily selected illustration case, each concentric circle represents 18 degrees field of view from the horizontal plane, with the outer circumference of the outermost circle being level with the horizon. The inventors have determined that the arc subtending the two outer circles (i.e., 36 degrees from the horizon) contains the relevant information in many hemispheric scenes for many applications (although again, this value can be varied depending upon the particular application).

Calculating the total circular area of the entire image circle yields 1257 units squared. The are of the three inner circles is 254 units squared. Therefore, the two outer circles contain about 80% of the usable area on the imaging device. Note that the image blocks corresponding to the horizon are spread across more area on the imager device than those in the central area of the image. Thus, the image blocks of the imager device are dominated by objects along the horizon, and those are the area of interest. This correlates to greater resolution for the peripheral areas of the scene.

The panoramic image provided by the imager is ideally suited for teleconferencing. For example, with the image lens apparatus mounted in the center of a conference table, from the plane of the table, a hemispheric view is presented. If the participants of the conference are seated around the table and the microphone array located conveniently on the table, the important image information, i.e. the participants, are found with the imager along a 10 to 30 degree or 45 degree segment of the horizon, by far the bulk of the images of interest. Therefore, using the present invention with audio detection to determine the direction of the current speaker, the desired image segments can be electronically manipulated between speakers automatically controlled by the direction of the current speaker's voice from the array disposed at or near the center of the conference table. Camera steering and image segment selection among participants speaking is undetectable by the participants, providing for minimal distractions and maximum concentration by the participants of the conference.

II. Image Storage

The image received on the imager device is passed on to the system components for storage and/or transmission to a remote teleconferencing site. For photographic processes, a storage device might be film; while for electronic processes, the storage device might be electronic storage in the form of random access memories, a conventional diskette or hard file, or video recording tape. The entire display of the scene (along with any secondary documentation) can be stored as a single image on the storage device.

As should be apparent from the configuration of the imager device in FIG. 4, the image is stored or transmitted in a "warped" form. The warped image is caused not only by the wide-angle nature of the lens (i.e. the "keystoning" effect), but also by the enhanced peripheral field of view of the lens (i.e., magnification along the periphery). The underlying concept is that a partial slice of the scene can be reproduced with the proper aspect ratio for the human visual system (i.e., as a perspective corrected view).

Figure 5:
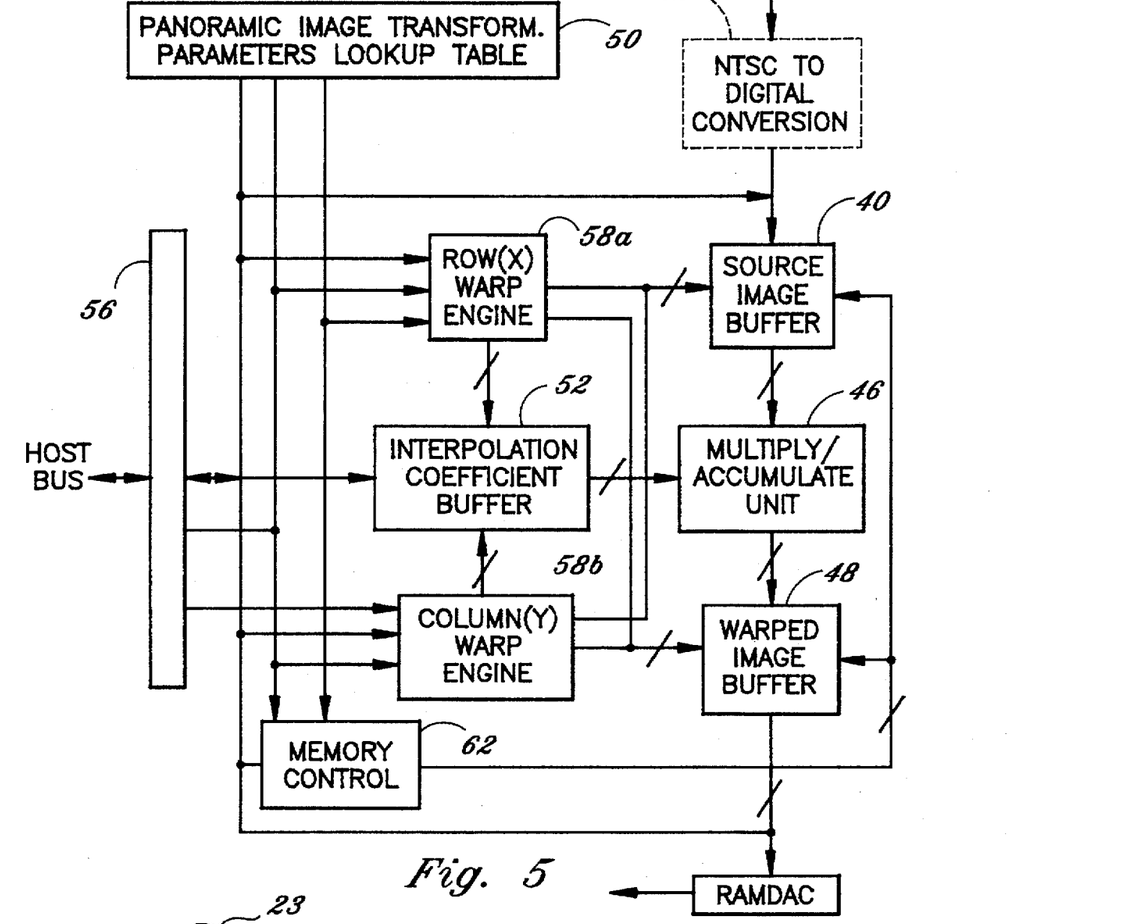
FIG. 5 is a schematic block diagram of the panoramic transform processor subsystem for use with the teleconferencing system of the present invention.

Looking at FIG. 5, the stored image will be loaded into the source image buffer 40 if it has been stored in electronic form on the host system, an example of which would be a personal computer or controller. Alternatively, the image can be brought in for processing without going through storage for real-time teleconferencing transmission. As one option, an analog signal from a video camera 11 (FIG. 1A) can connect into an NTSC-to-digital converter 42. This converts the image from analog information into a digital bit map (i.e., into "pixels"). The source image is then loaded into the source image frame buffer 40. However, as indicated previously, any type of camera can be used to provide the electronic input to buffer 40. The buffer preferably operates with sufficient speed so that real-time viewing is possible.

III. Image Retrieval/Display

Referring to FIG. 1A, the video camera 11 image can be selectively accessed and transformed for display at the source location or at a remote teleconference location. In order to recreate a proper display of the scene in two dimensions for perspective-correct viewing, processor logic in transform processor engine 22 is utilized (see FIG. 1). The transform processors may be made of collections of small-scale, medium-scale, large-scale, or very-large-scale integrated (VLSI) circuits, examples of which are image re-sampling sequencers, commercially available from Raytheon Semiconductors (formerly TRW LSI Products, Inc., LaJolla, Calif.), which are marketed under the mark/designation TMC2301 and TMC2302.

In FIG. 5, the re-sampling sequencers control the address sequencing of the pixels in the source image buffer 40 through a multiply-accumulate unit 46, and from there into the warped image buffer 48. The sequencers control the filtering or remapping of two-dimensional images from a set of Cartesian coordinates (x,y) as defined within each sector "unit" (A1, B1, etc.) onto a newly transformed set of coordinates (u,v). The "fish-eye" type of transformations described in U.S. Pat. No. 5,185,667 are based on non-constant second-order derivatives. A different set of second-order derivatives employed for the transforms associated with the sequencers can also handle three-dimensional images by re-sampling them from a set of Cartesian coordinates (x,y,z) into a new, transformed set (u,v,w). Typically, these sequencers can support nearest-neighbor, bilinear interpolation or convolution re-sampling, and can operate at speeds allowing real-time operation. Alternate electronic solutions can be constructed using VLSI or application-specific integrated circuits.

Re-mapped pixel locations (i.e., interpolation "kernels") of more than one pixel in the bit map requires an external interpolation coefficient look-up table 50 and the multiply/accumulate unit 46 as shown in FIG. 5. A table "walk" is typically performed on each source pixel, thus providing a smoother image by summing the products of the original lens image data with the appropriate interpolation coefficients. By capturing the hemispheric lens image data into source image buffer 40, the warp engine can be programmed to perform a perspective correction, much like an inverse keystoning effect. The re-mapping of the pixel locations is matched to the differential magnification of the particular periphery-enhancing lens used.

Direct access to the interpolation coefficient look-up table 50 and to the transformation parameters is also often desirable to allow dynamic modification of the interpolation algorithm. Thus, a local interpolation coefficient buffer 52 to update the varying transform parameters is included to allow for real-time still and motion image transformations.

The row and column warping engines 58a, 58b of the transform processor 22 supply addresses to the source image buffer 40. The addresses are determined by the interpolation algorithm chosen. The multiply-accumulate unit 46 takes the pixels supplied by the source image buffer 40 under warping engine control and multiplies the pixels together using combinational logic with weighting factors dependent on the algorithm. Compensation for aberration (e.g., spherical aberration) can also be made at this point. Finally, the composed interpolated pixels are sent to the warped image buffer 48. The address location within the warped image buffer is again determined by the warping. The algorithm parameters from lookup table 50 are input to the registers of the row and column warping engines 58a, 58b, as well as into the interpolation coefficient buffer 52.

The memory controller/clock circuitry 62 provides refresh control to the source and warped image buffers 40, 48. In addition, all clock sources are synchronized through this circuitry. The bus interface and control circuitry 56 also provide an interface to the host system bus (i.e., for MCA, ISA, etc.) and the re-mapping circuitry. This interface logic serves to load control information into the re-mapping circuitry and to provide a path to transport warped images to the system display buffer (not shown; part of host system), or store images to disk via the system bus prior to warping. An optional random access memory digital-to-analog converter (RAMDAC) 66 provides support for a local display connection if desired.

One feature of the transform processors is the valid source address flag within the transform processor engine. This allows the user to construct abutting sub-images in the (x,y) plane without danger of edge interference. Thus, edge detection of the unused areas outside the circular image of FIG. 4 can alert the system to ignore these values.

The image capture function can also be accomplished with motion video devices. All types of image data are input to the source image buffer 40 for processing as desired. The NTSC digitizer 42, for example, can provide real-time data from an NTSC video camera 11 used for teleconferencing. Any similar device that converts an image to the appropriate digital format for input to the source image buffer can be employed as optional element 42 in FIG. 5. Prerecorded distorted images generated through this invention's optical system can also be input through optional conversion block 42 to allow dynamic manipulation of previously recorded image data.

The image transformation performed on the captured digitized image from modified hemispheric coordinates to planar coordinates for display is one of a multitude of possible image transformations, any of which can be invoked in real-time for smooth merging of effects. These transformations include, but are not limited to pans, up/downs, zooms, tiles, rotations, scaling, cropping, and image shear, which can be controlled using human or computer input. Image filtering can be performed as well as edge detection in associated processes during the course of manipulation. These services can be applied to any system image loaded into the source image buffer, thus providing a host of added features beyond the simple application of the hemispheric lens and display system.

The advantage of the image transformation logic becomes apparent when describing particular applications. A security camera application can be implemented to view an entire panorama such that the security monitor will display full-motion rate images in real-time. Source image coordinates for still images can also be sequenced, allowing perceived animation or full-motion renditions by simply reloading new source image coordinates into the warping engines as frames are drawn from memory. Details from other stored images can be utilized to give the effect of full motion panning of the horizon within the captured image by the lens.

Figure 6A:
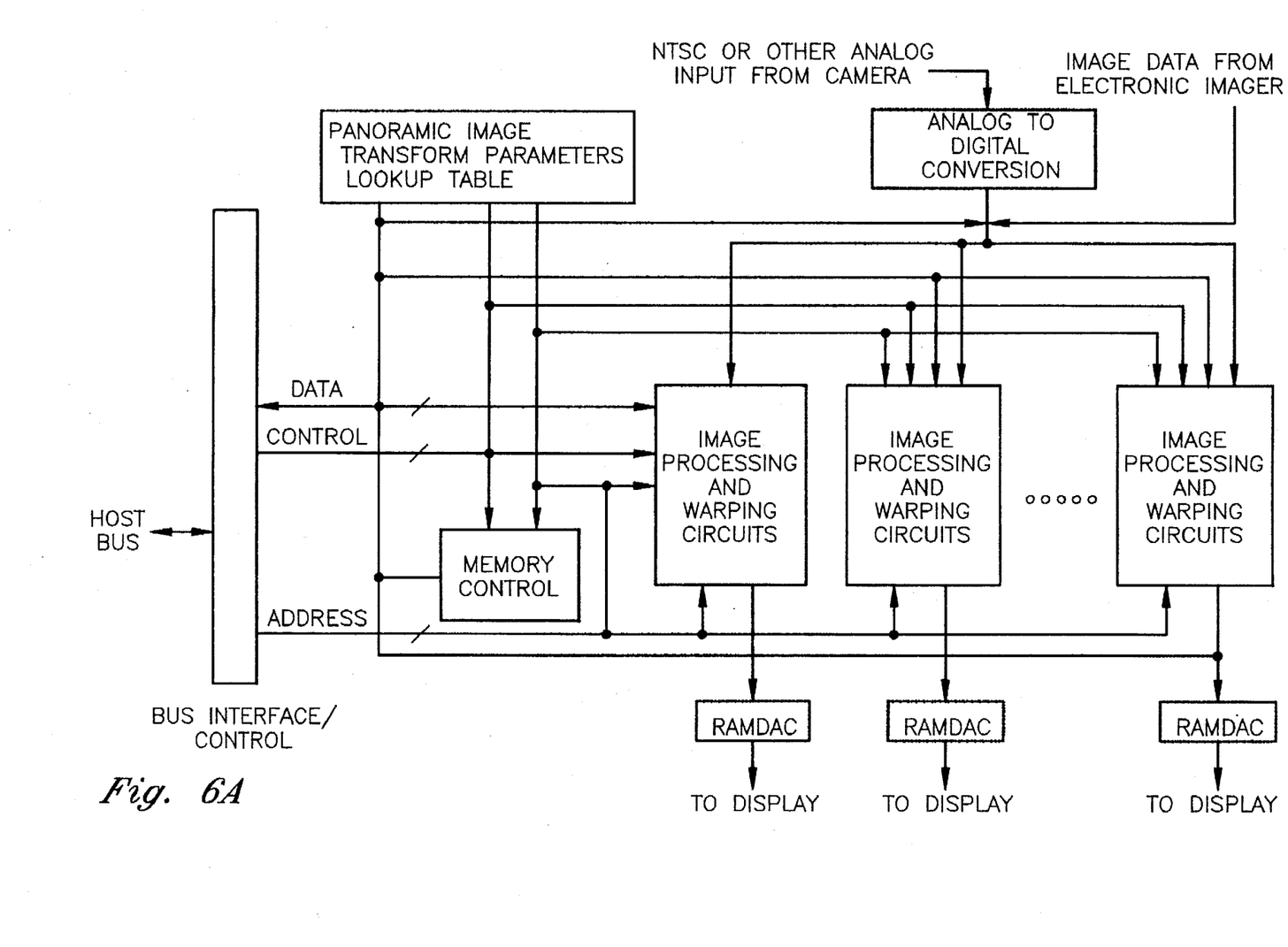
FIGS. 6A and 6B are a schematic diagram showing how multiple transform processor subsystems can be tied into the same distorted image to provide multiple different view perspectives to different users from the same source image as described in the parent application.
Figure 6B:
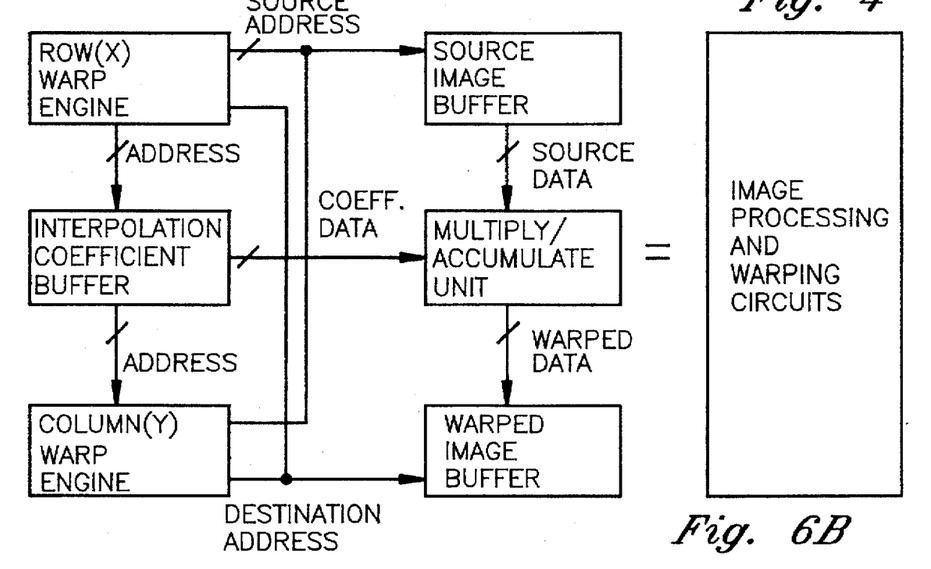

Finally, the transform processor subsystem can produce multiple different outputs simultaneously from individual stored or currently converted images. Referring to FIGS. 6A and 6B, with the main transform processor circuits collected into a simplified single block as shown in the lower drawing, multiple outputs are generated from a single image source, either motion or still, with individual effects for each scene as desired, allowing several scenes on different display devices or several windows on a single display. This is accomplished by incorporating several image processing subsystems within one overall system.

In all cases, by having greater resolution of the peripheral image of a scene, the details of any objects along the horizon will be enhanced. Further, aberrations occurring around the periphery of the lens (i.e., spherical aberrations) can be more fully and completely compensated for, as the aberrations are spread across a greater area on the imager device.

As described above, the present invention provides a visual imaging system that efficiently captures, stores, and displays visual information about an enhanced hemispheric field of view existing particularly along the horizon, and that allows electronic manipulation and selective display thereof even after acquisition and storage, while minimizing distortion. The present invention provides an automatic, audio directed video camera steering of segmented images selected from a hemispherical view ideally suited for teleconferencing.

The principles, embodiments, and modes of operation of the present invention have been described in the foregoing specification. The invention that is intended to be protected herein should not, however, be construed to the particular form described as it is to be regarded as illustrative rather than restrictive. Variations and changes may be made by those skilled in the art without department from the spirit of the present invention. Accordingly, the foregoing detailed description should be exemplary in nature and not limiting as to the scope and spirit of the invention as set forth in the appended claims.

What is claimed is:

1. An automatic audio controlled video camera steering system for electronic imaging and manipulation of a hemispheric field of view, comprising:

at least two microphones;

audio detection circuitry connected to said microphones for determining which of said microphones is receiving audio energy;

means for generating a signal representing the direction of the received audio energy based on signals from the microphones;

a video camera for receiving optical images of the field of view and for producing video image output signals;

an optical system associated with said video camera for producing the optical images from a hemispheric field of view for optical conveyance to said video camera, said optical system having a configuration that emphasizes the peripheral content of the panoramic field of view (when the central lens axis is oriented vertically) as compared to the central content of a hemispheric field of view, this being accomplished through differential magnification;

an imager device associated with said camera for receiving the optical images from said lens and for providing digitized output signals;

input image memory for receiving the digitized output signals from said imager device and for storing the digitized output signals;

an image transform processor or set of circuits for selectively accessing and processing the digitized output signals from said input image memory according to user defined criteria;

output image memory for receiving the processed signals from the image transform processor, and means connected to said output image memory from said hemispheric field of view for selecting a particular segmentized image from the hemispheric field of view representative of the direction from the camera of the microphone array determined to be receiving sound wave energy;

an output display connected to said output image memory for displaying the signals in said output image memory according to the user defined criteria.

2. The system as in claim 1, wherein said optical system has a configuration that images the peripheral portion of the hemispheric scene onto at least 50% –90% of the usable surface area of the imaging device, when used in an electronic image capture apparatus.

3. The system as in claim 2, wherein said optical system includes a color aberrated wide field lens and a gradient index hemispheric lens.

4. The system as in claim 2, wherein said optical system has a configuration which emphasizes the field of view from 1 to 45 degrees up from the horizon in a hemispherical captured image, the lens representing one of many configurations that may selectively emphasize some subset of the aforesaid 1 to 45 degrees covered.

5. The system as in claim 4, wherein said optical system includes a wide field multi-element lens and a coordinated fiber array geometrically fabricated with an annular input end and a rectangular output end.

6. The system as in claim 4, wherein said optical system includes a wide field multi-element lens and a coordinated fiber array geometrically fabricated with an annular input end and a circular output end.

7. A teleconferencing system for electronic manipulation of a hemispheric scene, comprising:

a plurality of microphones;

means connected to the output of said microphones for determining the amplitude levels of audio signals from the microphones;

means for detecting and comparing the audio signals from said microphones to determine the direction of a particular speaker;

means for providing an output signal representing the direction of a speaker at a given time;

a camera imaging system for receiving optical images of the field of view and for producing output video signals corresponding to the optical images;

an optical system associated with said camera imaging system for producing the optical images from a field of view for optical conveyance to said camera imaging system;

an imager device associated with said camera for receiving the optical images from said lens and for providing digitized output signals;

input image memory for receiving the digitized output signals from said imaging device and for storing the digitized output signals;

an image transform processor for selectively accessing and processing the digitized output signals from said input image memory according to user-defined criteria;

means connected to said image transform processor from said microphone direction means to provide the image segment of a hemispheric scene to be selected representing the direction of the speaker based on the audio signals from that array of microphones;

output image memory for receiving the processed signals from the image transform processor means;

an output display device connected to said output image memory for displaying the signals in said output image memory according to user-defined criteria;

wherein the improvement comprises said optical systems having a configuration that emphasizes the peripheral content of field of view of a hemispheric scene as compared to the central content, such that said imager device receives magnified optical images of the peripheral portion of the hemispheric field of view.

8. A teleconferencing method for electronically capturing, storing, and manipulating a hemispheric field of view, having a plurality of individual human speakers, comprising the steps of:

providing a plurality of microphones connected to a microphone audio detection circuit that can provide an output signal that determines which microphone is in use at a given point in time, indicative of the direction of the human speaker;

providing an optical system having a configuration that enhances the peripheral portion of the field of view in the direction of the human speaker;

capturing the hemispheric field of view with the periphery-enhancing optical system and imaging the field of view onto an imager device by enhancing the peripheral field of view;

storing the captured image as a single image;

selectively accessing a portion of the stored image according to user-defined criteria;

transforming the stored image so that the stored image can be displayed as a perspective-correct image;

selecting from a portion of the field of view a specific image segment representative of the direction of the speaker;

displaying the perspective-correct image in a user-defined format.

9. The method as in claim 8, wherein said transforming step comprises manipulating the peripheral-enhanced image into a perspective-correct image.

10. The method as in claim 8, wherein said periphery-enhancing optical system selectively magnifies visual content within an arc of between 10 and 45 degrees up from the horizon in a hemispheric field of view onto the imager device.

11. The method as in claim 8, wherein the storage step comprises storing the captured image in electronic storage.

12. A method for electronically manipulating a hemispheric scene having an enhanced peripheral field of view stored as an image on a video camera, comprising the steps of:

providing a plurality of microphones connected to an audio detection circuit that determines the direction of a given speaker;

converting the image on a video camera into electronic output signals;

selectively accessing a portion of the output signals according to user-defined criteria;

transforming the accessed portion of the output signals by manipulating the peripheral-enhanced field of view so that the stored image can be displayed as a perspective-correct image in a direction based on audio signals from said audio detection circuit;

selecting a particular image segment as a function of speaker direction for display;

displaying the perspective-correct image in the user-defined format.

13. A videoconferencing imaging system having automatic camera steering comprising:

plurality of microphones disposed in a common plane strategically positioned relative to each other and relative to conference participants to be captured on video for remote video and audio transmission of each participant's image and spoken word;

microphone output circuit connected to each of said microphones;

audio detection processor having an input connected to said microphone output circuit;

conference platform for arranging participants in individual locations about said conference platform;

video camera including a hemispheric lens mounted strategically in a predetermined location on said conference platform capable of presenting a hemispheric view to said video camera from said platform;

video image view warping logic circuit connected to the output of said video camera and said output of said audio direction processor, said video image view warping logic circuit having a video output of specific regions of interest based on said hemispheric lens image and having an audio output;

a computer processor or other controller circuits having input connected to said view warping logic circuit for controlling the desired specific region of interest as a function of audio directed processor input related to the participant speaking to create a normal aspect ratio view based on the participants using the system; and video and audio transmission medium connected to the output of said view warping logic circuit for transmitting said audio and video signals to said remote video conference.

14. A videoconferencing image system having automatic camera steering as in claim 13, including:

said video image view warping logic circuit including a source image buffer connected to the input from the video camera lens;

a row (X) warp engine having an output connected to said source image buffer;

column (Y) warp engine, said row warp engine and said column warp engine connected to panoramic image transformation parameter look up table and said computer control output;

interpolation coefficient buffer connected to the output of said row (X) warp engine and said column (Y) warp engine;

multiply accumulation unit connected to the output of said source image buffer and said interpolation coefficient buffer for receiving coefficient data;

memory control device connected to the output of said panoramic image transformation parameter look up table and said computer controller;

warped image buffer connected to the output of said column (Y) warp engine and said memory control and having a warp data output connected to said transmission medium whereby the selection of a normal aspect ratio view containing specific regions of interest selected by the determination of the participant speaking is based on the participant's direction, as determined by the audio direction processor.

* * * * *